| (12) | United States Patent<br>Palaniappan | (10) Patent No.: US 8,724,745 B2<br>(45) Date of Patent: May 13, 2014 |

(54) METHOD AND APPARATUS FOR DECODING CODED DATA STREAMS

(75) Inventor: Sathappan Palaniappan, Bangalore (IN)

(73) Assignee: LSI Corporation, Milpitas, CA (US)

( * ) Notice: Subject to any disclaimer, the term of this patent is extended or adjusted under 35 U.S.C. 154(b) by 537 days.

(21) Appl. No.: 12/869,820

(22) Filed: Aug. 27, 2010

(65) Prior Publication Data

US 2012/0051465 A1    Mar. 1, 2012

(51) Int. Cl.
*H04L 27/06* (2006.01)

(52) U.S. Cl.
USPC .................................................. 375/340

(58) Field of Classification Search
USPC .............. 327/7, 31; 342/357.3; 375/242, 316, 375/324, 333, 340, 341, 354, 355
See application file for complete search history.

(56) References Cited

U.S. PATENT DOCUMENTS

| 7,310,390 | B2 | 12/2007 | Bertram | |
|---|---|---|---|---|
| 7,466,772 | B2 | 12/2008 | Bertram | |
| 7,957,464 | B2 * | 6/2011 | Yamazaki | 375/239 |
| 8,023,594 | B1 * | 9/2011 | Li et al. | 375/340 |
| 2005/0094756 | A1 | 5/2005 | Bertram | |
| 2008/0069272 | A1 | 3/2008 | Bertram | |
| 2010/0061490 | A1 * | 3/2010 | Noeldner | 375/341 |
| 2010/0134349 | A1 * | 6/2010 | Lennen et al. | 342/357.03 |
| 2011/0261969 | A1 * | 10/2011 | Elkhatib et al. | 381/22 |
| 2011/0273271 | A1 * | 11/2011 | Alicot | 340/10.1 |

* cited by examiner

*Primary Examiner* — Sam K Ahn
*Assistant Examiner* — Shawkat M Ali
(74) *Attorney, Agent, or Firm* — Prakash Nama; Global IP Services, PLLC

(57) ABSTRACT

A system and method for decoding coded data streams is disclosed. In one embodiment, in a method for decoding coded data streams, a coded data stream including an embedded input clock signal is oversampled to measure substantially sequentially a plurality of pulse widths in a current frame using a sync and reference value acquisition digital logic. The coded data steam includes a plurality of frames, and each frame includes a preamble of fixed length and a series of data bits. The oversampling is performed using a high frequency clock signal having a substantially higher frequency than a frequency of the embedded input clock signal. Then, the coded data stream is decoded based on the measured plurality of pulse widths in the current frame using a data decoder.

15 Claims, 4 Drawing Sheets

METHOD AND APPARATUS FOR DECODING CODED DATA STREAMS

BACKGROUND

AES-EBU (Audio Engineering Society-European Broadcasting Union) and S/PDIF (Sony Philips Digital Interconnect Format) are both implementations of the IEC 61937 standard, which specifies a data link layer protocol and physical layer for carrying out digital audio transmissions and to aid transfer of digital signals between devices and has now effectively become the widely used standard. A common practice for an S/PDIF interface is to carry compressed digital audio signal as defined by the IEC 61937 standard. In S/PDIF implementation, bi-phase mark coding is typically used for compressing the digital audio signal. Using the bi-phase mark coding, a data stream is combined with a digital clock in a single channel and inputted into an S/PDIF decoder for decoding.

The S/PDIF decoder, which receives an S/PDIF signal, i.e., the bi-phase mark coded data stream including the data stream and the clock in a single line, has to first perform clock recovery on the S/PDIF signal to acquire synchronization before decoding the data. Upon acquiring the synchronization with the S/PDIF signal, the data is decoded using an equivalent internal clock. In digital domain, the clock recovery is a challenging task. Further, different technologies use different sampling frequencies.

Typical methods of decoding bi-phase mark coded data streams involve the use of analog or digital phase locked loops (PLLs) to recover the bi-phase mark coded signal clock. However, analog PLLs suffer the drawback that they cannot easily be integrated with digital logic in typical application specific integrated circuits (ASICs), gate arrays and field programmable gate arrays (FPGAs). Further, analog PLLs may not be able to accurately recover the clock and thus may result in poor decoding of the data. The recovered clock using analog PLLs may drift with respect to the source clock (IEC 61937 signal) and may result in periodically losing the synchronization. So, this may require extra circuitry to monitor the clock recovery and acquire synchronization again. Digital solutions are, therefore typically, preferred. Unfortunately, the digital solutions may also suffer a number of drawbacks and depending on the technology in which the apparatus it is to be implemented, a PLL with the required clock speeds and accuracy can be cumbersome and difficult to implement in a cost effective manner.

BRIEF DESCRIPTION OF THE DRAWINGS

Various embodiments are described herein with reference to the drawings, wherein.

The drawings described herein are for illustration purposes only and are not intended to limit the scope of the present disclosure in any way.

DETAILED DESCRIPTION

A system and method for decoding coded data streams is disclosed. In the following detailed description of the embodiments of the present subject matter, reference is made to the accompanying drawings that form a part hereof, and in which are shown by way of illustration specific embodiments in which the present subject matter may be practiced. These embodiments are described in sufficient detail to enable those skilled in the art to practice the present subject matter, and it is to be understood that other embodiments may be utilized and that changes may be made without departing from the scope of the present subject matter. The following detailed description is, therefore, not to be taken in a limiting sense, and the scope of the present subject matter is defined by the appended claims.

The terms 'pulse widths' and 'count values' are used interchangeably throughout the document.

Figure 1:
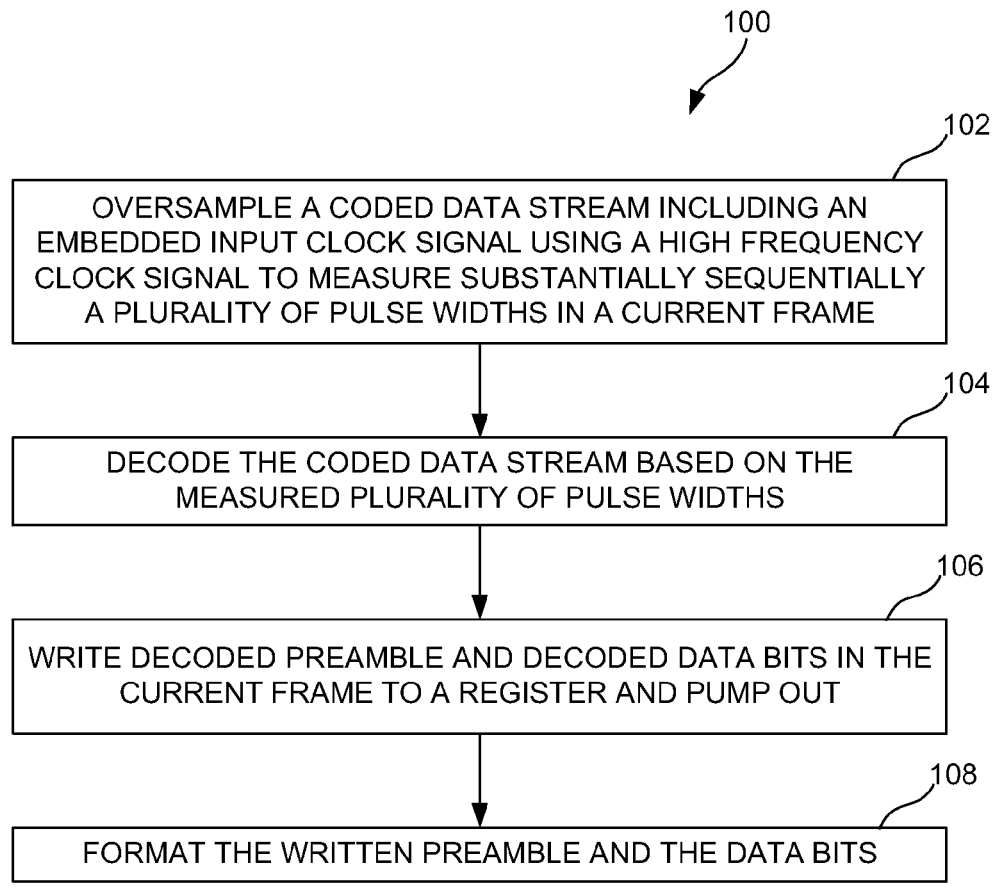
FIG. 1 illustrates a flow diagram of a method for decoding coded data streams, according to one embodiment.

FIG. 1 illustrates a flow diagram 100 of a method for decoding coded data streams, according to one embodiment. For example, the coded data streams may be IEC 61937 based coded data streams. Each of the coded data streams includes a plurality of frames, where each frame includes a preamble of fixed length and a series of data bits. At step 102, a coded data stream including an embedded input clock signal is oversampled to measure substantially sequentially a plurality of pulse widths in a current frame using a sync and reference value acquisition digital logic (e.g., the sync and reference value acquisition digital logic 202 of FIG. 2). The oversampling is performed using a high frequency clock signal (oversampling clock) having a substantially higher frequency than a frequency of the embedded input clock signal. In one embodiment, the pulse widths of at least two positive pulses or at least two negative pulses in the current frame are measured substantially sequentially using the sync and reference value acquisition digital logic.

Then, sync of the coded data stream is acquired based on the measured plurality of pulse widths using the sync and reference value acquisition digital logic. The sync of the coded data stream is acquired based on satisfying a condition per below equations:

$$\frac{K3}{2} > K1 \ \& \ \frac{K3+K1}{4} \approx K1 \ \text{OR} \ \frac{C3}{2} > C1 \ \& \ \frac{C3+C1}{4} \approx C1$$

where, K3 and K1 are measured pulse widths associated with the at least two positive pulses and, C3 and C1 are measured pulse widths associated with the at least two negative pulses. The measured plurality of pulse widths are snatched and are declared as reference pulse width values upon acquiring the sync of the coded data stream using the sync and reference value acquisition digital logic. In other words, one of the measured pulse widths of the at least two positive pulses and at least two negative pulses are stored in a register and are declared as reference pulse width values for further decoding of the coded data streams.

The steps of measuring, acquiring, and snatching on the coded data stream are repeated to acquire sync and to snatch reference pulse width values. Further, a type of preamble is detected based on a pattern with respect to the snatched reference pulse width values using a data decoder (e.g., the data decoder 204 of FIG. 2). For example, one of allowed B, M or W preamble synchronization patterns is detected based on a pattern of stored pulse widths of the at least two positive pulses and the at least two negative pulses. At step 104, the coded data stream is decoded based on the measured plurality of pulse widths in the current frame using the data decoder. For example, decoding the coded data stream includes decoding a preamble and coded data bits in the current frame using the snatched reference pulse width values and the detected type of preamble.

Figure 2:
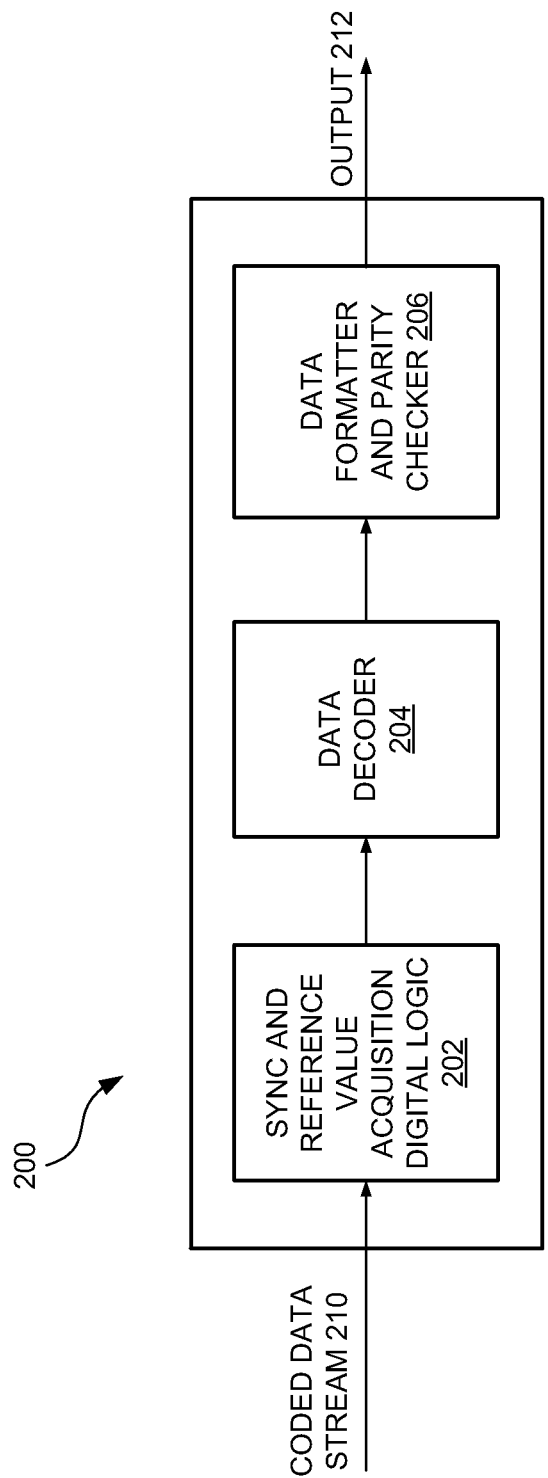
FIG. 2 is a block diagram illustrating an exemplary decoding apparatus.

At step 106, the decoded preamble and the decoded data bits in the current frame are written to the register and pumped out using a data formatter and parity checker (e.g., the data formatter and parity checker 206 of FIG. 2). At step 108, the written preamble and the data bits are formatted using the data formatter and parity checker. In one embodiment, the preamble and the data bits are formatted per IEC 61937 standard. The steps of detecting, decoding, writing, and formatting using the snatched reference pulse width values are repeated for a next frame in the coded data stream. Moreover, in one example embodiment, a non-transitory computer-readable storage medium for decoding coded data streams having instructions that, when executed by a computing device cause the computing device to perform a method as described above.

FIG. 2 is a block diagram illustrating an exemplary decoding apparatus 200. As illustrated, the decoding apparatus 200 includes a sync and reference value acquisition digital logic 202, a data decoder 204, and a data formatter and parity checker 206. The sync and reference value acquisition digital logic 202 oversamples a coded data stream 210 to measure substantially sequentially a plurality of pulse widths in a current frame. The data decoder 204 decodes the coded data stream 210 based on the measured plurality of pulse widths in the current frame. The oversampling and decoding of coded data streams are explained in detail in the foregoing description of FIG. 1.

The data formatter and parity checker 206 writes the decoded data stream in the current frame to a register and formats the data stream (to form a sub-frame of 32 time slots, where two sub-frames form a frame) per the IEC 61937 standard. The register is a 32 bit register and is capable of shifting 1 bit after one data is written. The data may be written in most significant bits (MSB) 4 bits (type of preamble) or 1 bit (decoded data). A counter keeps track of number of data bits decoded. When the last data is decoded, the data bit is not written into the register. Instead, a parity error check is performed and result is written to the register.

Figure 3:
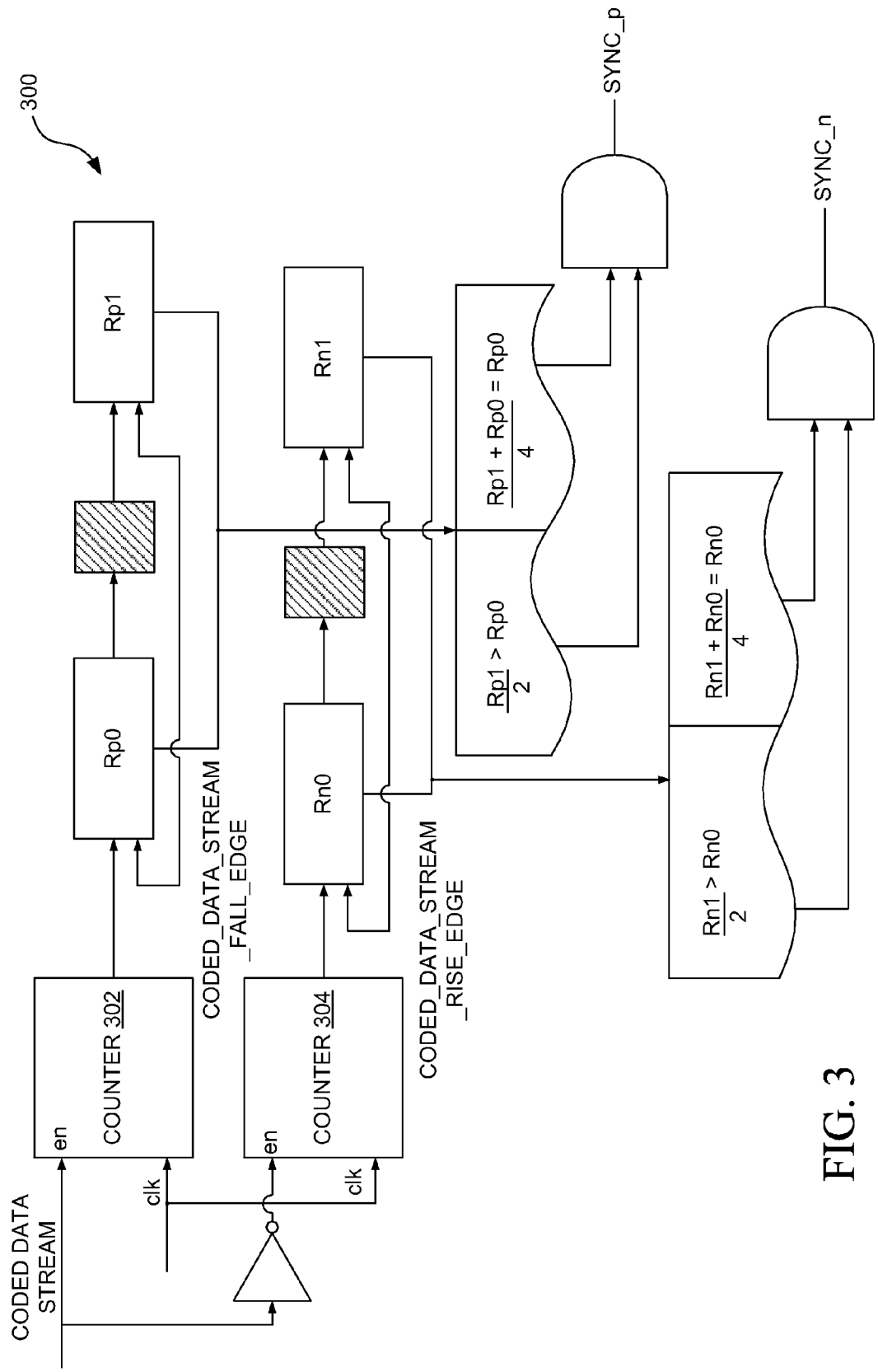
FIG. 3 illustrates a digital architectural diagram of the sync and reference value acquisition digital logic of FIG. 2, according to one embodiment.

FIG. 3 illustrates a digital architectural diagram 300 of the sync and reference value acquisition digital logic 202 of FIG. 2, according to one embodiment. Suppose that the sync and reference value acquisition digital logic 202 receives a coded data stream 1110__1000__1 . . . (preamble followed by data). Here, a counter 302 runs and upon a falling edge, count values or pulse widths (e.g., K3, K2, and K1) are snatched in a register Rp0. A pipeline register Rp1 copies the count values in Rp0 on each edge of the coded data stream. Similarly, when the sync and reference value acquisition digital logic 202 receives a coded data stream 0001__0111__0 . . . (preamble followed by data), a counter 304 runs and the count values or the pulse widths (e.g., C3, C2, and C1) are snatched in a register Rn0. A pipeline register Rn1 copies the count values in Rn0 on each edge of the coded data stream.

According to an embodiment of the present subject matter, sync of the coded data stream is acquired based on satisfying a condition per below equations:

$$\frac{K3}{2} > K1 \ \& \ \frac{K3+K1}{4} \approx K1 \text{ for positive pulse and}$$

$$\frac{C3}{2} > C1 \ \& \ \frac{C3+C1}{4} \approx C1 \text{ for negative pulse.}$$

It can be noted that, Rp1 holds K3 and Rn0 holds K1 when the sync is acquired. Also, Rn1 holds C1 and Rn0 holds C3 when the sync is acquired. At every edge of the coded data stream, the count values should match with at least with one of the reference pulse width values (e.g., K1/C1, K2/C2, and K3/C3); else the sync is considered to be lost and resynchronization with the coded data stream may be performed again.

Figure 4:
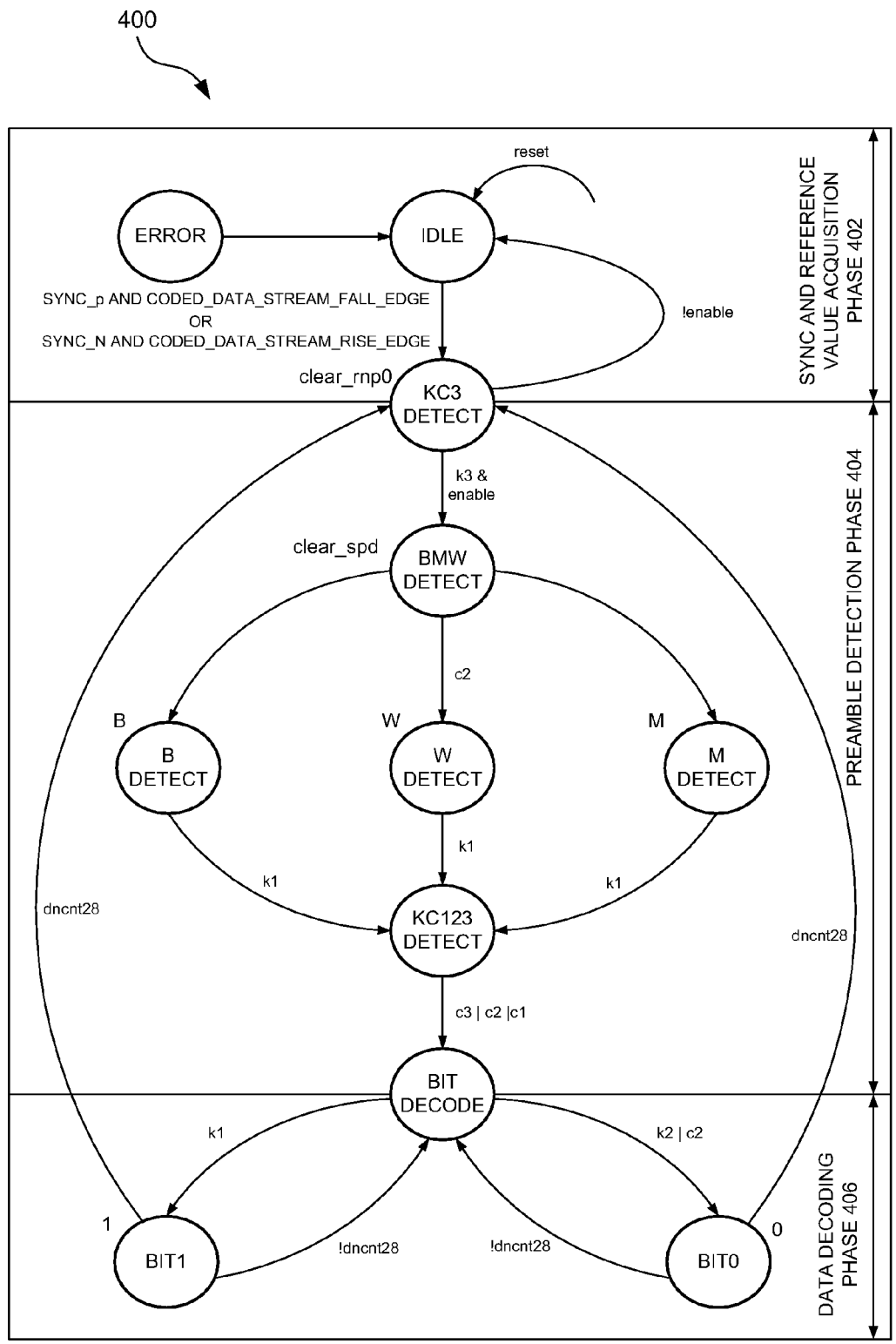
FIG. 4 is a state machine diagram illustrating a decoding method and apparatus, according to an embodiment of the present subject matter.

FIG. 4 is a state machine diagram 400 illustrating a decoding method and apparatus, according to an embodiment of the present subject matter. As illustrated, the state machine diagram 400 includes three phases: a sync and reference value acquisition phase 402, a preamble detection phase 404 and a data decoding phase 406. During the sync and reference value acquisition phase 402, sync with the coded data stream 210 is acquired and the reference pulse width values K3/C3, K2/C2 and K1/C1 are snatched. Once sync is acquired and 'enable' is asserted, the preamble detection phase 404 is entered. The registers Rp0 and Rn0 are cleared, so that these registers may be used during the preamble detection phase 404. In the sync and reference value acquisition phase 402, a first preamble is encountered and subsequent data is left without decoding.

Further, in the preamble detection phase 404, a next preamble (e.g., a second preamble) and its type are detected. Once the next preamble is detected, the data decoding phase 406 is entered. Anytime an 'error' signal is asserted, the preamble detection phase 404 falls into an error state before getting to an idle state. During the data decoding phase 406, bi-phase mark coded (BMC) data is decoded. If the current count value is equal to 'K1' or 'C1', the data bit is decoded as bit-1. If the current count value is equal to 'K2' or 'C2', the data bit is decoded as bit-0.

Further, if the current sub-frame (28 bits) is decoded completely, the preamble detection phase 404 is entered for decoding a next sub-frame. It can be noted that, any error occurred during the data decoding phase 406 indicates a BMC protocol violation, wherein control falls back to an idle state for resynchronization with the coded data stream. The transition from all states to "ERROR" state is not shown in the state machine diagram 400.

States 'BIT_1', 'BIT_0', and 'ERROR' are called as "blinking states" as these states last for one clock of oversampling clock, whereas all other states last for more than one clock. In accordance with above-described embodiments, 'ERROR' is signaled based on different conditions in different states. Further, whenever counter value exceeds K3 or C3, 'not_bmc' is signaled. Various conditions are given in the table below:

| SI. NO: | STATES | CONDITION |
|---|---|---|
| 1 | IDLE | NIL |
| 2 | KC3_DETECT, BMW_DETECT & KC123_DETECT | Count > K3 or C3 |
| 3 | BIT_DECODE | Count > K2 or C2 |
| 4 | B_DETECT, M_DETECT, W_DETECT | Count > K1 or C1 |

In the preamble detection phase 404 and the data decoding phase 406, during the edges of the coded data stream, the counter values are copied to the registers (Rp0 and Rn0). Further, these values are compared against the reference pulse width values snatched during the sync and reference value acquisition phase 402. Based on the compared values, K3, K2, K1, C3, C2, and C1 are signaled.

Sony Philips Digital Interconnect Format (S/PDIF) allows data to be run at fixed rates of 8 KHz, 32 KHz, 44.1 KHz, 48 KHz and 192 KHz, and recovers the clock rate by encoding the data. The bit stream consists of pulse-code modulation (PCM) audio data broken down into small samples and inserted into a larger structure that also carries various statuses and information data. The highest level organization is an audio block, which may correspond to a number of samples of the PCM audio data. Each audio block is broken into 192 frames numbered 0 to 191. Each frame is further divided in 2 sub-frames (or channels): left (L) and right (R) (stereo audio).

Each sub-frame includes information for one single sample of the PCM audio, or more simply, one channel of audio. Each sub-frame is organized into 32 time slots numbered 0 to 31, each of which corresponds roughly to a single bit. Not all of the time the blocks are used to send actual audio data, a number of them are set aside for signaling use, and others for transmitting data about the channels. In normal use, only 20 time blocks are used for audio, providing a 20-bit sound quality (compared with a CD at 16 bits per sample). Thus, a complete audio block includes 192 samples from two channels of audio and other data, containing 12,288 bits in total.

In digital audio, typical sampling frequency, 'fs' ranges from 8 KHz to 192 KHz. Thus, input data rate is fs*32*2, since there are 32 bits per channel and 2 channels per frame. For various common sampling frequencies, data rate, K1, and K3 values are shown in the table below. K1 is calculated as $T_{DR}/T_{OS}$, where, $T_{DR}$ is the time period of the IEC 61937 based coded data stream and $T_{OS}$ is the time period of the oversampling clock. K3 is three times of K1.

| Sl. NO: | Sampling Frequency | Data Rate | K1 = $T_{DR}/T_{OS}$ | K3 = 3 * [$T_{DR}/T_{OS}$] |
|---|---|---|---|---|
| 1 | 8 KHz | 512 kbps | 386 | 1160 |
| 2 | 32 KHz | 2.048 Mbps | 96 | 290 |
| 3 | 44.1 KHz | 2.8224 Mbps | 70 | 210 |
| 4 | 48 KHz | 3.072 Mbps | 64 | 193 |
| 5 | 192 KHz | 12.288 Mbps | 16 | 48 |

Assume that the over-sampling clock is at least 16 times the data rate; oversampling clock>16*12.288 MHz=196.608 MHz. Thus, from the above table, maximum count occurs during K3 at 8 KHz=1160 and minimum count occurs during K1 at 192 KHz=16. Hence, counter and registers of 11 bits wide are required to store the count values.

In various embodiments, the above-described methods and systems of FIGS. 1 through 4 enable decoding of data based on sync acquisition, without recovering the embedded clock. This eliminates use of PLLs in the design. The above-described methods and systems computes embedded clock frequency of an input clock signal by updating clock factor field. This may be useful for audio-video synchronization. When synchronization is lost, re-synchronization is achieved automatically. Further, the above-described methods and systems provide a reliable design by updating various statuses like sync acquired, sync lost, and protocol error (preamble/BMC).

Although, the present embodiments have been described with reference to specific example embodiments, it will be evident that various modifications and changes may be made to these embodiments without departing from the broader spirit and scope of the various embodiments. Furthermore, the various devices, modules, analyzers, generators, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

What is claimed is:

1. A method for decoding coded data streams, wherein each coded data steam includes a plurality of frames, and wherein each frame includes a preamble of fixed length and a series of data bits, comprising: oversampling a coded data stream including an embedded input clock signal and a data stream using a high frequency clock signal having a substantially higher frequency than a frequency of the embedded input clock signal to measure substantially sequentially a plurality of pulse widths in a current frame using a sync and reference value acquisition digital logic, wherein measuring substantially sequentially the plurality of pulse widths comprises: measuring substantially sequentially the plurality of pulse widths of at least two positive pulses or at least two negative pulses in the current frame; acquiring sync of the coded data stream based on the measured plurality of pulse widths using the sync and reference value acquisition digital logic; snatching the measured plurality of pulse widths and declaring them as reference pulse width values upon acquiring the sync of the coded data stream using the sync and reference value acquisition digital logic; detecting a type of preamble based on a pattern with respect to the snatched reference pulse width values using a data decoder; and decoding the coded data stream based on the measured pulse widths of the at least two positive pulses or the at least two negative pulses in the current frame using the data decoder.

2. The method of claim 1, wherein decoding the coded data stream based on the measured pulse widths of the at least two positive pulses or the at least two negative pulses in the current frame, comprises: decoding the preamble and coded data bits in the current frame using the snatched reference pulse width values and the detected type of preamble using the data decoder.

3. The method of claim 2, further comprising:
writing the decoded preamble and the decoded data bits in the current frame to a register and pumping out using a data formatter and parity checker; and
formatting the written preamble and the data bits using the data formatter and parity checker.

4. The method of claim 3, further comprising:
repeating the steps of measuring, acquiring and snatching on the coded data stream to acquire the sync and to snatch the reference pulse width values; and
repeating the steps of detecting, decoding, writing and formatting using the snatched reference pulse width values for a next frame in the coded data stream.

5. The method of claim 1, wherein acquiring the sync of the coded data stream based on the measured plurality of pulse widths, comprises: acquiring the sync of the coded data stream based on satisfying a condition per below equations:

$$\frac{K3}{2} > K1 \ \& \ \frac{K3 + K1}{4} \approx K1 \ \text{OR} \ \frac{C3}{2} > C1 \ \& \ \frac{C3 + C1}{4} \approx C1$$

wherein K3 and K1 are measured pulse widths associated with the at least two positive pulses and C3 and C1 are measured pulse widths associated with the at least two negative pulses.

6. The method of claim 5, wherein snatching the measured plurality of pulse widths and declaring them as reference pulse width values using the sync and reference value acquisition digital logic comprises:

storing one of the measured pulse widths of the at least two positive pulses and at least two negative pulses and declaring them as reference pulse width values using the sync and reference value acquisition digital logic.

7. The method of claim 6, wherein detecting the type of preamble comprises: detecting one of allowed B, M and W preamble synchronization patterns based on a pattern of stored pulse widths of the at least two positive pulses and the at least two negative pulses.

8. A non-transitory computer-readable storage medium for decoding coded data streams having instructions that, when executed by a computing device, cause the computing device to perform a method comprising: oversampling a coded data stream including an embedded input clock signal and a data stream using a high frequency clock signal having a substantially higher frequency than a frequency of the embedded input clock signal to measure substantially sequentially a plurality of pulse widths in a current frame using a sync and reference value acquisition digital logic, wherein measuring substantially sequentially the plurality of pulse widths comprises: measuring substantially sequentially the plurality of pulse widths of at least two positive pulses or at least two negative pulses in the current frame; acquiring sync of the coded data stream based on the measured plurality of pulse widths using the sync and reference value acquisition digital logic; snatching the measured plurality of pulse widths and declaring them as reference pulse width values upon acquiring the sync of the coded data stream using the sync and reference value acquisition digital logic; detecting a type of preamble based on a pattern with respect to the snatched reference pulse width values using a data decoder; and decoding the coded data stream based on the measured pulse widths of the at least two positive pulses or the at least two negative pulses in the current frame using the data decoder.

9. The non-transitory computer-readable storage medium of claim 8, wherein decoding the coded data stream based on the measured pulse widths of the at least two positive pulses or the at least two negative pulses in the current frame, comprises: decoding the preamble and coded data bits in the current frame using the snatched reference pulse width values and the detected type of preamble using the data decoder.

10. The non-transitory computer-readable storage medium of claim 9, further comprising:
    writing the decoded preamble and the decoded data bits in the current frame to a register and pumping out using a data formatter and parity checker; and
    formatting the written preamble and the data bits using a data formatter and parity checker.

11. The non-transitory computer-readable storage medium of claim 10, further comprising:
    repeating the steps of measuring, acquiring and snatching on the coded data stream to acquire the sync and to snatch the reference pulse width values; and
    repeating the steps of detecting, decoding, writing and formatting using the snatched reference pulse width values for a next frame in the coded data stream.

12. The non-transitory computer-readable storage medium of claim 8, wherein acquiring the sync of the coded data stream based on the measured plurality of pulse widths, comprises: acquiring the sync of the coded data stream based on satisfying a condition per below equations:

$$\frac{K3}{2} > K1 \ \& \ \frac{K3+K1}{4} \approx K1 \ \text{OR} \ \frac{C3}{2} > C1 \ \& \ \frac{C3+C1}{4} \approx C1$$

wherein K3 and K1 are measured pulse widths associated with the at least two positive pulses and C3 and C1 are measured pulse widths associated with the at least two negative pulses.

13. The non-transitory computer-readable storage medium of claim 12, wherein snatching the measured plurality of pulse widths and declaring them as reference pulse width values using the sync and reference value acquisition digital logic comprises:
    storing one of the measured pulse widths of the at least two positive pulses and at least two negative pulses and declaring them as reference pulse width values using the sync and reference value acquisition digital logic.

14. The non-transitory computer-readable storage medium of claim 13, wherein detecting the type of preamble comprises: detecting one of allowed B, M and W preamble synchronization patterns based on a pattern of stored pulse widths of the at least two positive pulses and the at least two negative pulses.

15. An apparatus for decoding coded data streams, wherein each coded data steam includes a plurality of frames, and wherein each frame includes a preamble of fixed length and a series of data bits, comprising: a sync and reference value acquisition digital logic configured to oversample a coded data stream including an embedded input clock signal and a data stream using a high frequency clock signal having a substantially higher frequency than a frequency of the embedded input clock signal to measure substantially sequentially pulse widths of at least two positive pulses or at least two negative pulses in a current frame and further configured to acquire sync of the coded data stream based on satisfying a condition per below equations:

$$\frac{K3}{2} > K1 \ \& \ \frac{K3+K1}{4} \approx K1 \ \text{OR} \ \frac{C3}{2} > C1 \ \& \ \frac{C3+C1}{4} \approx C1$$

wherein K3 and K1 are measured pulse widths associated with the at least two positive pulses and C3 and C1 are measured pulse widths associated with the at least two negative pulses; a data decoder configured to decode the coded data stream based on the measured pulse widths of the at least two positive pulses or the at least two negative pulses in the current frame; and a data formatter and parity checker configured to write the decoded data stream in the current frame to a register and configured to format the data stream.

* * * * *